United States Patent
Ho et al.

(10) Patent No.: US 8,693,711 B2
(45) Date of Patent: Apr. 8, 2014

(54) CAPACITIVE TRANSDUCER AND FABRICATION METHOD

(75) Inventors: Tzong-Che Ho, Hsinchu (TW); Lung-Tai Chen, Fengshan (TW); Yao-Jung Lee, Rende Township (TW); Chao-Ta Huang, Hsinchu (TW); Li-Chi Pan, Baoshan Township (TW); Yu-Sheng Hsieh, Zhubei (TW)

(73) Assignee: Industrial Technology Research Institute (TW)

( * ) Notice: Subject to any disclaimer, the term of this patent is extended or adjusted under 35 U.S.C. 154(b) by 990 days.

(21) Appl. No.: 12/643,417

(22) Filed: Dec. 21, 2009

(65) Prior Publication Data

US 2011/0150261 A1   Jun. 23, 2011

(30) Foreign Application Priority Data

Dec. 17, 2009  (TW) ............................... 98143286 A

(51) Int. Cl.
*H04R 25/00* (2006.01)
(52) U.S. Cl.
USPC ........................... 381/174; 381/369; 381/175
(58) Field of Classification Search
USPC ......... 381/113, 116, 355, 369, 174, 175, 191; 367/170, 174, 181; 73/724; 438/53
See application file for complete search history.

(56) References Cited

U.S. PATENT DOCUMENTS

| | | | |
|---|---|---|---|
| 3,946,422 A * | 3/1976 | Yagi et al. ...................... 257/254 |
| 4,910,840 A | 3/1990 | Sprenkels et al. | |
| 5,677,965 A | 10/1997 | Moret et al. | |
| 6,732,588 B1 | 5/2004 | Mullenborn et al. | |
| 6,781,231 B2 | 8/2004 | Minervini | |
| 7,146,016 B2 * | 12/2006 | Pedersen ....................... 381/175 |
| 7,166,910 B2 | 1/2007 | Minervini | |
| 7,436,054 B2 | 10/2008 | Zhe | |
| 2005/0185812 A1 | 8/2005 | Minervini | |
| 2005/0254673 A1 | 11/2005 | Hsieh et al. | |
| 2006/0140423 A1 * | 6/2006 | Tanabe et al. ................. 381/174 |
| 2008/0157238 A1 | 7/2008 | Hsiao | |
| 2008/0164545 A1 | 7/2008 | Hsiao | |
| 2011/0056302 A1 * | 3/2011 | Lutz ................................ 73/724 |

FOREIGN PATENT DOCUMENTS

| CN | 1505438 | 6/2004 |
|---|---|---|
| JP | 11-331988 | 11/1999 |
| TW | 200827288 | 7/2008 |

OTHER PUBLICATIONS

Office Acton dated May 29, 2013 from corresponding application No. CN201010129471.4.

* cited by examiner

*Primary Examiner* — Huyen D Le
(74) *Attorney, Agent, or Firm* — Lowe Hauptman & Ham, LLP

(57) ABSTRACT

A capacitive transducer and fabrication method are disclosed. The capacitive transducer includes a substrate, a first electrode mounted on the substrate, a cap having a through-hole and a cavity beside the through-hole, a second electrode mounted on the cap across the through-hole. The second electrode is deformable in response to pressure fluctuations applied thereto via the through-hole and defines, together with the first electrode, as a capacitor. The capacitor includes a capacitance variable with the pressure fluctuations and the cavity defines a back chamber for the deformable second electrode.

15 Claims, 11 Drawing Sheets

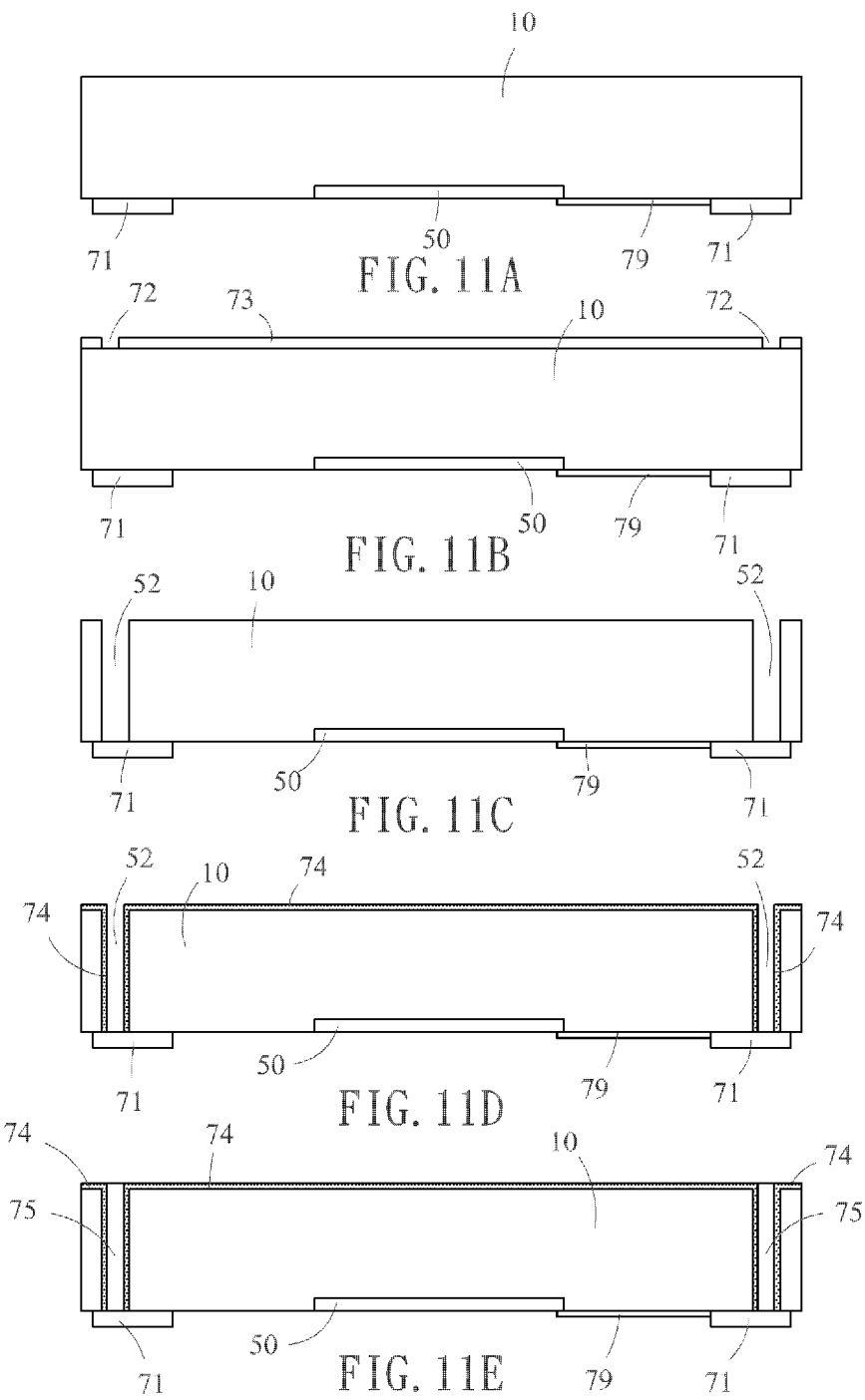

CAPACITIVE TRANSDUCER AND FABRICATION METHOD

CROSS REFERENCE TO RELATED APPLICATIONS

This application claims priority of Taiwan Patent Application No. 98143286, filed on Dec. 17, 2009 the entirety of which is incorporated by reference herein.

BACKGROUND

1. Technical Field

The disclosure relates to a capacitive transducer and a fabrication method thereof.

2. Technical Art

In the hearing instrument and mobile communication system industry, the trend is to make components of small sizes while still maintaining good electro-acoustic performance and operability, thereby ensuring good user friendliness and satisfaction. In the past, several attempts have been made to make microphone systems smaller while maintaining or improving their technical performance data.

US 2008/0157238 discloses a MEMS (micro-electro-mechanical systems) microphone module having an application specific IC and a microphone chip. The application specific IC has a plurality of first vias and a plurality of first pads, and the first vias are connected to the first pads. The microphone chip has a resonant cavity, a plurality of second vias and a plurality of second pads, and the second vias are connected to the second pads.

U.S. Pat. No. 7,166,910 discloses a silicon condenser microphone package comprising a transducer unit, a substrate, and a cover. The substrate includes an upper surface having a recess formed therein. The transducer unit is attached to the upper surface of the substrate and overlaps at least a portion of the recess, wherein a back volume of the transducer unit is formed between the transducer unit and the substrate.

U.S. Pat. No. 6,781,231 discloses a microelectromechanical system package with a microelectromechanical system microphone, a substrate, and a cover. The substrate has a surface for supporting the microelectromechanical microphone. The cover includes a conductive layer having a center portion bounded by a peripheral edge portion. A housing is formed by connecting the peripheral edge portion of the cover to the substrate. The center portion of the cover is spaced from the surface of the substrate to accommodate the microelectromechanical system microphone. The housing includes an acoustic port for allowing an acoustic signal to reach the microelectromechanical system microphone.

U.S. Pat. No. 6,732,588 discloses a compact solid state silicon-based condenser microphone system suitable for batch production. The microphone system includes a transducer chip comprising a chamber, a diaphragm positioned at the first lower surface and covering the second opening of the transducer chip. The transducer chip is flip-chip mounted onto a post-processed chip also comprising a chamber.

SUMMARY

In accordance with some embodiments, a capacitive transducer is provided. The capacitive transducer comprises a substrate and a cap. A first electrode is mounted on the substrate, the cap has a through-hole and a cavity besides the through-hole. A second electrode is mounted on the cap across the through-hole. The second electrode is deformable in response to pressure fluctuations applied thereto via the through-hole and defines, together with the first electrode, a capacitor having a capacitance variable with the pressure fluctuations. The cavity defines a back chamber for the deformable second electrode.

In accordance with further embodiments, a microphone is provided. The microphone comprises a housing having an internal volume and an opening that opens into the internal volume. A conductive back plate is provided on a wall of the housing inside the internal volume. A conductive diaphragm extends across the opening and is displaceable relative to the back plate in response to acoustic waves applied to the diaphragm. A sensing circuit is electrically connected to the diaphragm and the back plate for sensing relative displacements of the diaphragm and the back plate, and generating a signal indicative of the acoustic waves that caused the relative displacements. The internal volume defines a back acoustic chamber for the diaphragm and is disposed on both sides of a plane of the diaphragm.

In accordance with yet further embodiments, a capacitive transducer manufacturing method is provided. The method comprises preparing a cap that has opposite first and second surfaces. The cap comprises a through-hole extending from the first surface to the second surface, a cavity extending from the second surface toward the first surface, and a conductive diaphragm extending across an opening of the through-hole on the second surface. A substrate is prepared to have opposite third and fourth surfaces. The substrate has a conductive back plate on the third surface. The cap is bonded by a wafer-to-wafer technique to the substrate with the second and third surfaces facing yet being spaced from each other so that the diaphragm and the back plate form a capacitor.

BRIEF DESCRIPTION OF THE DRAWINGS

The disclosed embodiments are illustrated by way of example, and not by limitation, in the figures of the accompanying drawings, wherein elements having the same reference numeral designations represent like elements throughout.

FIGS. 11A-11J are diagrams illustrating various steps for manufacturing the substrate in accordance with one or more embodiments.

DESCRIPTION OF EMBODIMENTS

Figure 1:
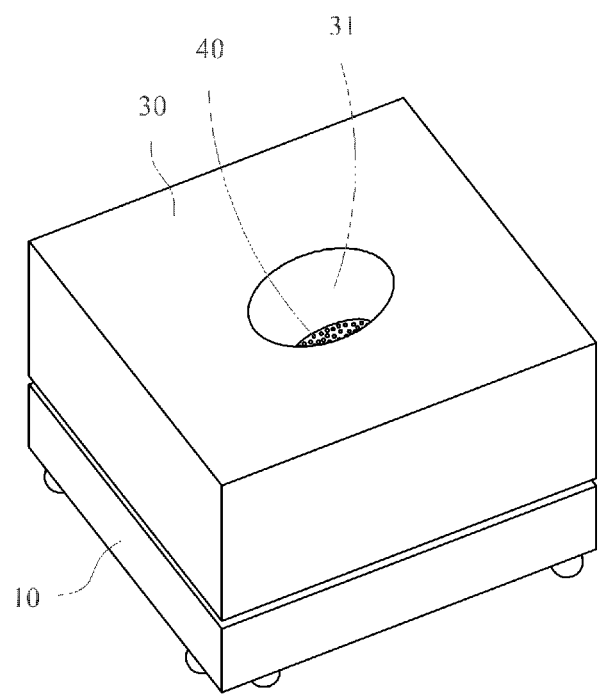
FIG. 1 is a perspective view of a capacitive transducer in accordance with one or more embodiments.
Figure 2:
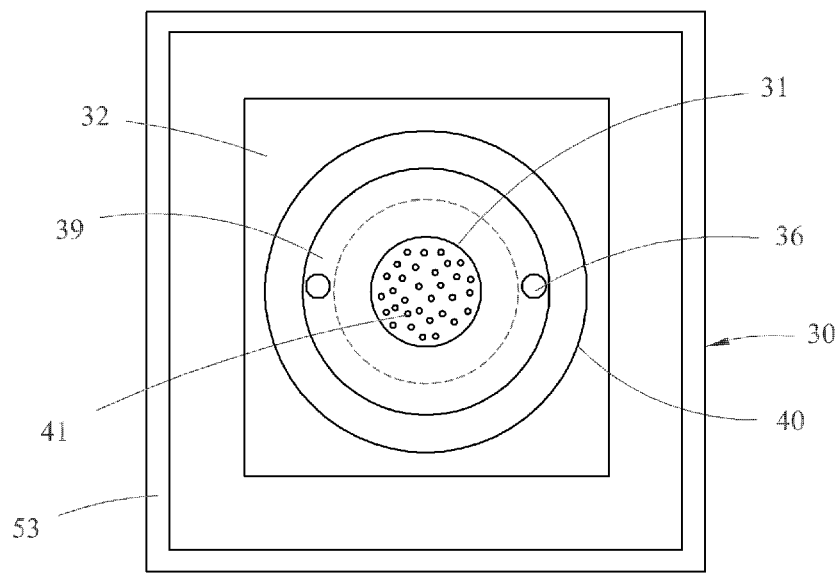
FIG. 2 is a bottom plan view of a cap of the capacitive transducer in accordance with one or more embodiments.
Figure 3:
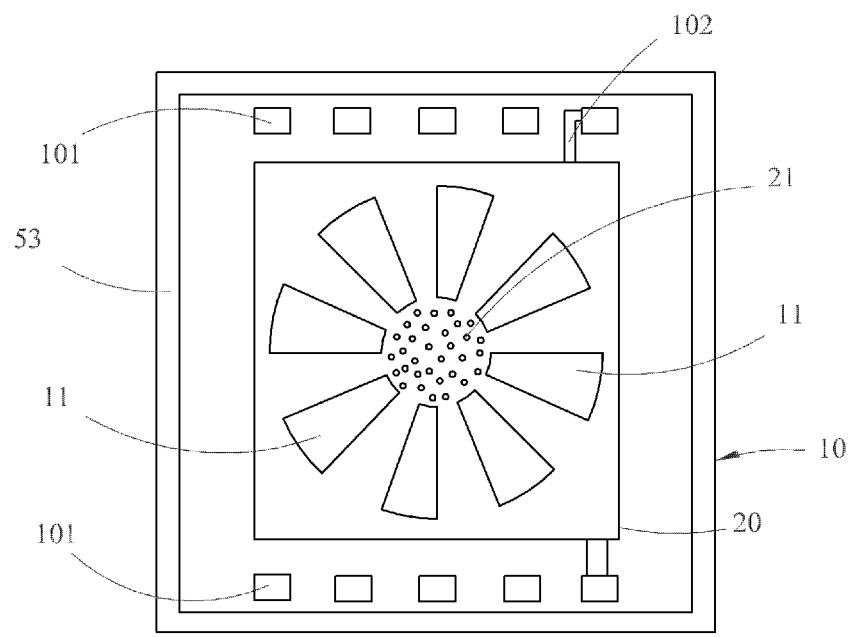
FIG. 3 is a top plan view of a substrate of the capacitive transducer in accordance with one or more embodiments.
Figure 5:
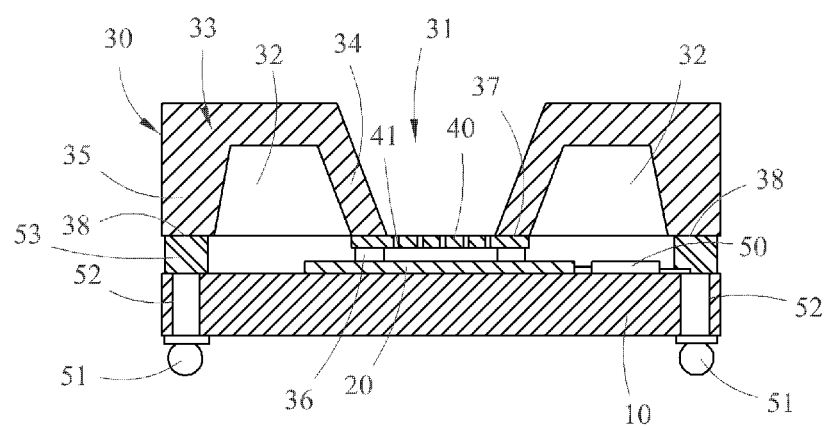
FIG. 5 is a cross-sectional view taken along line A-A in FIG. 4.

FIGS. 1-3 are various view of a capacitive transducer in accordance with one or more embodiments. The capacitive transducer could be a capacitive MEMS sensor package in some embodiments. The capacitive transducer including a substrate 10, a first electrode 20, a cap 30, a second electrode 40, and a sensing circuit 50. In some embodiments, the sensing circuit 50 is omitted and/or provided on an external device. The substrate 10 can be made of a wafer, an IC chip, or an equivalent material. The cap 30 also can be made of a wafer, or an equivalent material. The first electrode 20 is mounted on the substrate 10. The first electrode 20 is electrically connected, in some embodiments, to an electronic circuit, such as the sensing circuit 50, on the substrate 10 when the substrate 10 is a wafer or an IC chip. The cap 30 has a through-hole 31 and a cavity 32 besides the through-hole 31. The second electrode 40 is mounted on the cap 30 across the through-hole 31. The second electrode 40 is deformable in response to pressure fluctuations applied thereto via the through-hole 31 and defines, together with the first electrode 20, a capacitor having a capacitance variable with the pressure fluctuations. In some embodiments, the second electrode 40 is a diaphragm responsive to acoustic waves transmitted to the diaphragm via the through-hole 31. The cavity 32 defines a back chamber for the deformable second electrode 40. At least one of the first and/or second electrodes 20, 40 has at least one through hole 21, 41 (best seen in FIG. 7), respectively. The through hole(s) allow(s) acoustic waves or vibrations to access the cavity 32 and generate an acoustic resonance. In some embodiments, the first electrode 20 and/or the second electrode 40 has/have none of the through holes 21, 41. The substrate 10 has at least one metal pad 101, in some embodiments a plurality of metal pads 101, to electrically connect to the first electrode (back plate) 20 and/or the sensing circuit 50, and/or a TSV 52 (FIG. 5). In some embodiments, the substrate 10 has at least a concave portion 11 in acoustic communication with the cavity 32. In one or more embodiments, some or all concave portions 11 are further in acoustic communication with each other in the substrate 10. In further embodiments, at least two of the concave portions 11 are not in direct acoustic communication with each other in the substrate 10. At least one of the pads 101 is electrically connected to the first electrode 20 by a conductive element 102, and at least one of the pads 101 is directly connected to the TSV 52.

Figure 4:
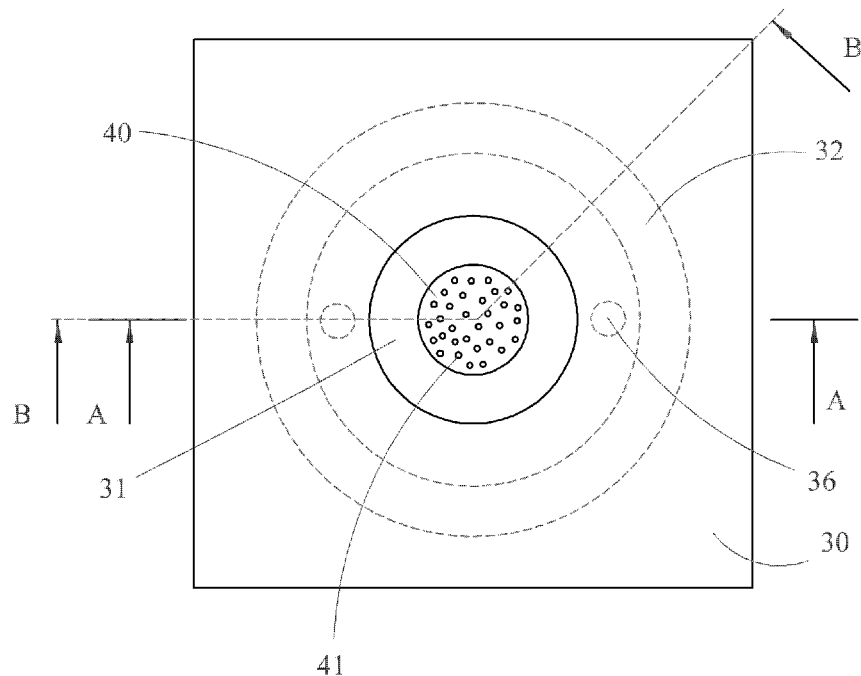
FIG. 4 is a top plan view of the capacitive transducer in accordance with one or more embodiments.

In some embodiments as shown in FIG. 4, at least one support 36 is mounted between the substrate 10 and the cap 30, for temporarily defining a desired distance between the cap 30 and the substrate 10 before bonding the substrate 10 and the cap 30 together to define a housing. The support 36 can be a conductive element, such as a metal element.

Figure 6:
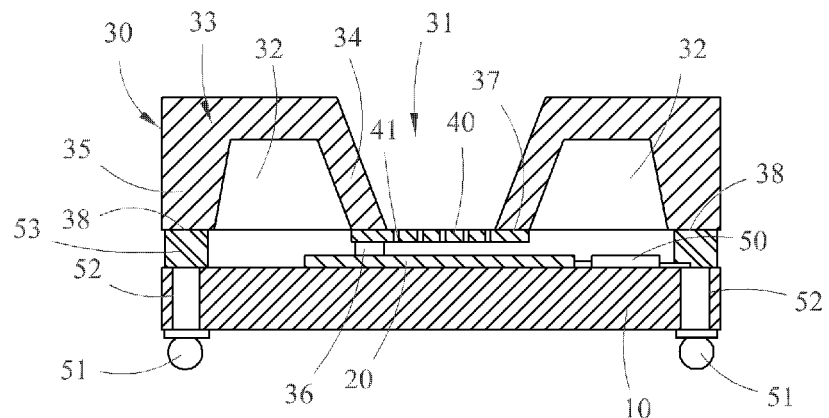
FIG. 6 is a cross-sectional view taken along line B-B in FIG. 4.

The first electrode 20 in some embodiments could be made by a metal plate, a conductive material, and so on. The first electrode 20 defines a back plate which forms with the second electrode 40 of a capacitor. The second electrode 40 is mounted on the cap 30 across the through-hole 31. The second electrode 40 in some embodiments could be made by a polycrystalline silicon film (or poly film), a conductive membrane, and so on. A surface of the poly film in some embodiments is disposed on a metal layer for connection to other circuitry. As discussed, the second electrode 40 is provided with the first electrode 20 to form the capacitor. The second electrode 40 is deformable and attached to the cap 30 across the through-hole 31, and the first electrode 20 is fixed on the substrate 10. The cap 30 has a cavity 32 beside the through-hole 31. The second electrode 40 is deformable in response to pressure fluctuations applied via the through-hole 31, and therefore the capacitance of the capacitor is variable with the pressure fluctuations. A back chamber is defined by a closed space, i.e., the internal volume of the housing composed of the substrate 10 and the cap 30. The back chamber comprises at least the cavity 32. The back chamber in some embodiments further comprises any space that is behind the second electrode 40 and in acoustic communication with the cavity 32. For example, such space can be between the first electrode 20 and the second electrode 40, and/or a concave portion 11 within the substrate 10, as shown in the different embodiments of FIGS. 6 and 7. As shown in FIG. 5, the cap 30 has a body 33, and inner and outer loop portions 34, 35 extending from the body 33 toward the substrate 10. The cavity 32 in the illustrated configuration of FIG. 5 is an annular chamber formed between the inner loop portion 34 and the outer loop portion 35, and the through-hole 31 is formed inside the inner loop portion 34. The inner loop portion 34 and the outer loop portion 35 respectively terminate at first and second ends 37, 38, and the transducer further comprises at least a support 36 between at least one of the first and second ends 37, 38 and the substrate 10. The second end 38 of the outer loop portion 35 attached a seal material (not show in FIG. 5) to provide an airtight space of between the cap 30 and the substrate 10. In FIGS. 5 and 6, for example, the substrate 10 has no cavity, such as concave portions 11. However, in FIG. 7, for example, one or more concave portions 11 is/are disposed within the substrate 10.

The sensing circuit 50, if included in the capacitive transducer, can be on at least one of the substrate 10, and is electrically coupled to the first and second electrodes 20, 40 for sensing the capacitance of the capacitor. The sensing circuit 50 in the illustrated configuration is disposed on/in the substrate 10 and is electrically connected to the first electrode 20 by a conductor on/in the substrate 10. The substrate 10 in one or more embodiments has at least one TSV (through-silicon via) 52, and at least one solder ball 51. The TSV 52 electrically connects the solder ball 51 to the sensing circuit 50 to transmit a sensing signal indicative of the capacitance of the capacitor and generated by the sensing circuit 50 to an external device. In some embodiments, one or more TSV(s) 52 is/are electrically connected to the electrode 20 and the electrode 40 through the respective conductor(s) disposed on/in the substrate 10 to allow an external device to determine the capacitance of the capacitor without requiring the sensing circuit 50 in the capacitive transducer. A sealing ring 53 is disposed between the cap 30 and the substrate 10. The sealing ring 53 hermetically seals the back chamber which is in acoustic communication with the outside of the capacitive transducer via at least one through-hole 41 on the second electrode 40.

The cap 30 and the solder ball 51 are on opposite sides of the substrate 10. The solder ball 51, as discussed, is electrically connected to the sensing circuit 50 for making an electrical connection to external devices.

Figure 7:
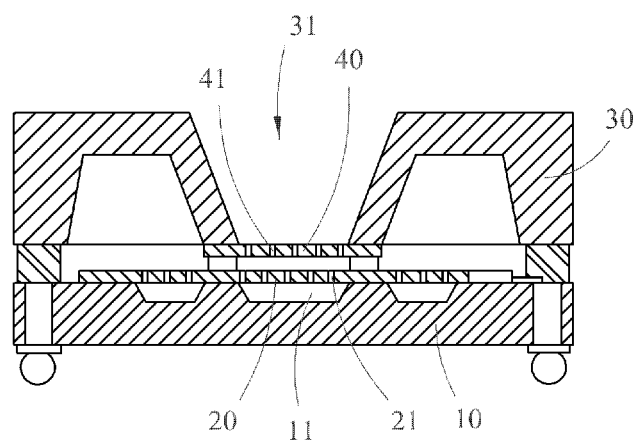
FIG. 7 are cross-sectional views similar to FIG. 5 showing various embodiments.

In some embodiments as illustrated in FIG. 7, the substrate 10 has at least one concave portion 11, in acoustic communication with the cavity 32 of the cap 30 to form a larger back chamber. The first electrode 20 includes at least one through-hole 21. In other embodiments, the first electrode 20 has no through-holes. The concave portion 11 and the cavity 32 together increase the volume of the back chamber which, in turn, reduces the spring constant of the back chamber to provide good acoustics and/or resonance conditions. The concave portion 11 can be of different shapes and provided in any desirable numbers and positions. For examples, the concave portion 11 of FIG. 7 has a slopped sidewall.

Figure 8:
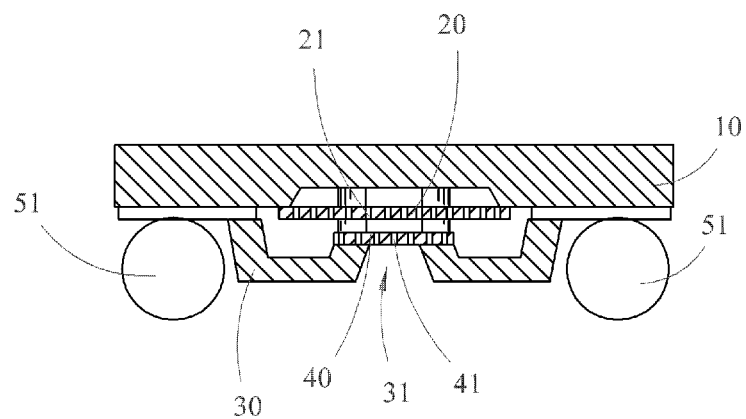
FIG. 8 is a cross-sectional view of another embodiment.

Refer to FIG. 8, the cap 30 and the solder balls 51 can be on the same side of the substrate 10. The sensing circuit 50 (if provided on the substrate 10) can be electrically connected with an external device through conductive patterns in/on the substrate 10 and the respective solder ball(s) 51, without requiring the TSVs. The capacitor is electrically coupled to the sensing circuit 50 as disclosed herein.

The cap 30 and the solder balls 51 are on the same side of the substrate 10. In this embodiment, the substrate 10 has a concave portion 11, and the cap 30 has a cavity 32. The electronic circuit 50 (not shown in FIG. 8), in some embodiments, is electrically connected to at least one pad 101 on the substrate 10. The pad 101 is electrically connected to the solder ball 51. The electronic circuit 50 can be disposed on/in the substrate 10. In some embodiments, the circuit 50 is disposed on a top surface of the substrate 10. In further embodiments, the circuit 50 is disposed on a bottom surface of the substrate 10. In yet further embodiments, the circuit 50 is disposed in the substrate 10.

In some embodiments, the capacitive transducer can be a microphone. The microphone comprising a housing, a conductive back plate 20, a conductive diaphragm 40, and, optionally, a sensing circuit 50. The housing can be a combined structure of the cap 30 and the substrate 10, but other arrangements are not excluded. The housing can made of wafer, or an equivalent material. The housing having an internal volume and an opening, such as a through-hole 31, that opens into the internal volume. The internal volume is defined by, e.g., the cavity 32 or/and the concave portion 11 to form a back chamber. Acoustic waves can enter the housing from the outside through the opening and the diaphragm 40 is caused to vibrate by the acoustic waves. The internal volume can be annular as disclosed with respect to FIGS. 4-6, but can have any other shapes in accordance with one or more embodiments. The internal volume receives the acoustic waves and generates an acoustic resonance. The conductive back plate 20 disposed on a wall, e.g., the substrate 10 or any other part, of the housing inside the internal volume. The back plate 20 can be a conductive plate, such as a metal plate. Other conductive materials are, however, not excluded. The back plate 20 defines the first electrode of the capacitive transducer. The conductive diaphragm 40 extends across the opening and is displaceable relative to the back plate 20 in response to acoustic waves applied from the outside and through the opening to the diaphragm 40. The conductive diaphragm 40 can be a metal plate or a poly film. Other conductive materials are, however, not excluded. The conductive diaphragm 40 defines the second electrode of the capacitive transducer. A capacitor is thus formed between the back plate 20 and the diaphragm 40. A sensing circuit 50 is electrically connected to the diaphragm 40 and the back plate 20 for sensing relative displacements of the diaphragm 40 and the back plate 20, and generating a signal indicative of the acoustic waves that caused the relative displacements. At least one of the diaphragm 40 and the back plate 20 has one or more through holes 21, 41 for allowing access of acoustic waves to various portions of the internal volume. The internal volume thus defines a back acoustic chamber for the diaphragm 40 and is disposed on both sides of a plane of the diaphragm 40. However, in embodiment as shown in FIG. 8, the back acoustic chamber can be disposed on one side of the plane of the diaphragm 40. In another embodiment, the back acoustic chamber is disposed on both sides of a plane of the back plate 20. In a further embodiment, the back acoustic chamber can be disposed on one side of the plane of the back plate 20. In some embodiments, the back acoustic chamber comprises an annular cavity extending around the opening. The back chamber can accept the sound/acoustic waves and generate an acoustic resonance. In some embodiments, the diaphragm 40 has opposite front and rear sides facing outwardly and inwardly of the housing, respectively, and a majority of the back chamber is positioned on the front side of the diaphragm 40.

Figure 9:
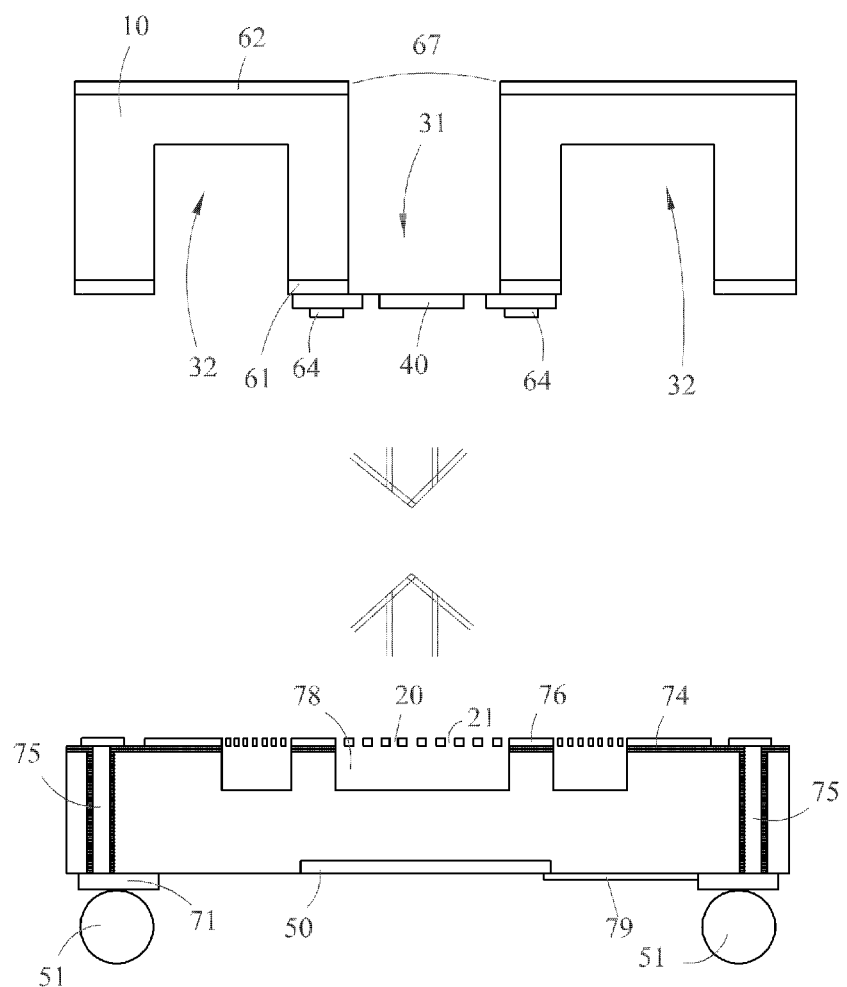
FIG. 9 is a diagram showing a cap and a substrate of the capacitive transducer prior to bonding, in accordance with one or more embodiments.

A capacitive transducer in accordance with one or more embodiments can be manufactured by wafer-to-wafer bonding so that a conductive diaphragm and a conductive back plate are fixed with a spacing therebetween to form a capacitor. Referring to FIG. 9, a cap 30 and a substrate 10 are shown as being ready to be bonded together. The cap 30 is formed from a cap wafer or equivalent materials as will be discussed herein below, and comprises a through-hole 31 extending from the top surface to the bottom surface of the cap wafer, a cavity 32 extending from the bottom surface toward the top surface, and a conductive diaphragm 40 extending across an opening of the through-hole 31 on the bottom surface.

Figure 10A:
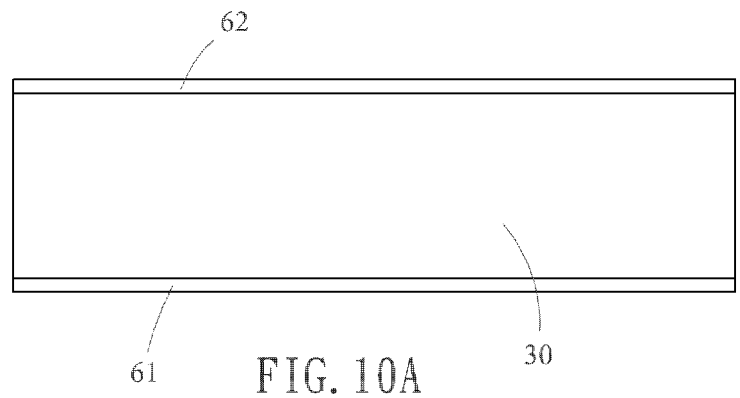
FIGS. 10A-10F are diagrams illustrating various steps for manufacturing the cap in accordance with one or more embodiments.
Figure 10B:
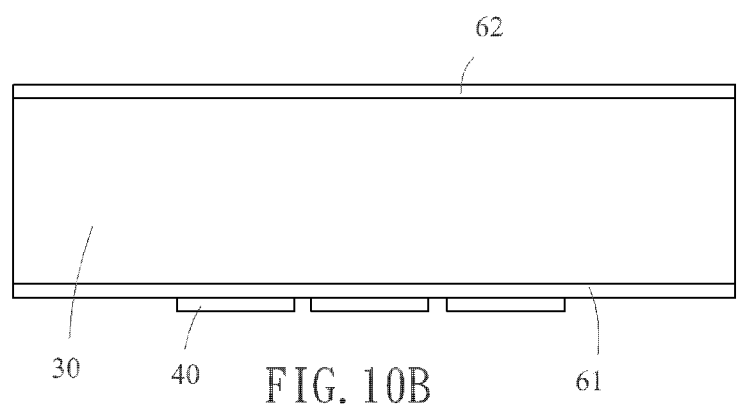
Figure 10C:
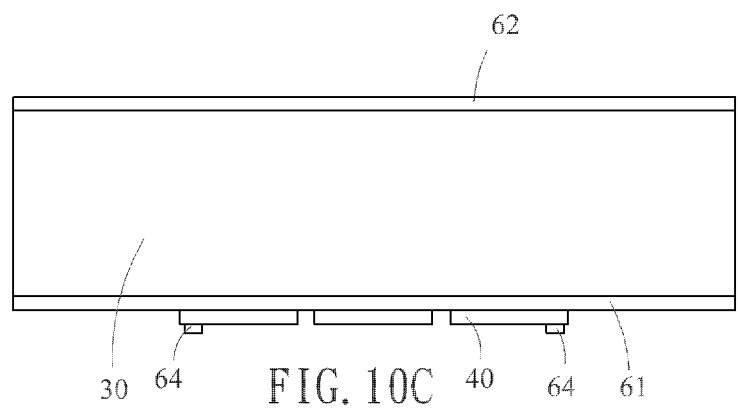

A fabrication process for the cap 30 of the capacitive transducer is shown in FIGS. 10A to 10F. Referring to FIG. 10A, a sacrificial layers 61, 62 are formed on opposite top and bottom surfaces of a cap wafer 301. A method for forming the sacrificial layers 61, 62 is to perform thermal oxidation to the top and bottom surfaces of the cap wafer 301 (e.g., a Silicon Wafer) to form $SiO_2$ layers 61, 62. Other methods of forming the sacrificial layers are, however, not excluded. Referring to FIG. 10B, a patterned conductive diaphragm 40 is then formed on the sacrificial layer 61. A method for forming the patterned conductive diaphragm includes photolithography and etching treatments in succession. The patterned conductive diaphragm 40 is made of polycrystalline silicon in some embodiments. Unwanted polycrystalline silicon is removed by dry etching. Other materials or methods of forming the patterned conductive diaphragm 40 are, however, not excluded. Referring to FIG. 10C, a plurality of support 64 is also formed on a portion of the conductive diaphragm 40. Other conductive materials for the support 64 are, however, not excluded.

Figure 10D:
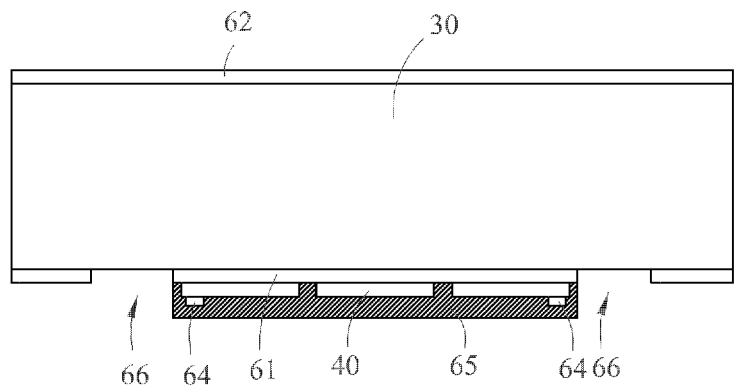
Figure 10E:
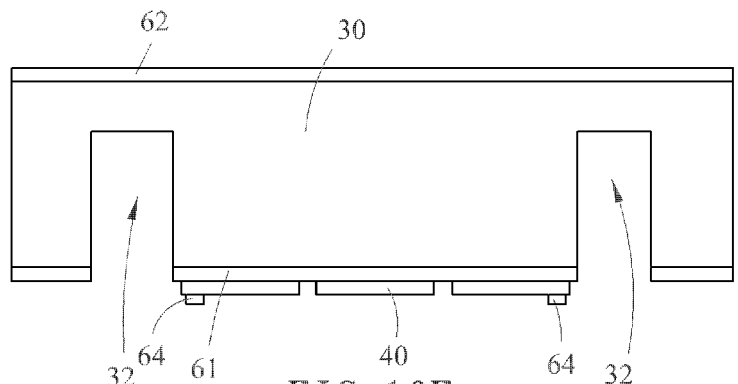

A photoresist layer 65 is then formed over the bottom surface of the cap wafer 301 including the support 64, the patterned conductive diaphragm 40, and the sacrificial layer 61. As shown in FIG. 10D, at least one portion area of the photoresist layer 65 and the sacrificial layers 61 is removed to expose at least one of the regions 66 where the bottom surface of the cap wafer 301 are not covered with the support 64, and the patterned conductive diaphragm 40. A method for defining the regions 66 is generally by photolithography. Other processes are, however, not excluded. Referring to FIG. 10E, at least a cavity 32 within the cap wafer 30 is formed by etching away at least one of the exposed regions 66 from the bottom surface of the cap wafer 301 to remove a partial thickness of the cap wafer 301. Deep Si etching can be used to form cavity 32. Other processes are, however, not excluded. The remaining photoresist layer 65 is then removed from the bottom surface of the cap wafer 301.

Figure 10F:
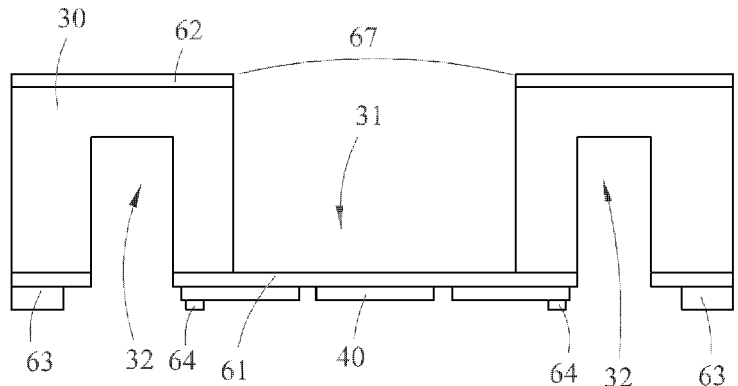

As shown in FIG. 10F, a region 67 of the cap wafer 301 is defined for forming a through-hole 31 through the cap wafer 301 by etching from the top surface of the cap wafer 301 downward to exposed a portion of the sacrificial layer 61. The region 67 is defined according to the region where the patterned conductive diaphragm 40 is located. A method for defining the region 67 is generally by photolithography. A method for forming the through-hole 31 includes deep Si etching. Other processes are, however, not excluded. A sealing 63 is to be disposed between the cap 30 and the substrate 10. The sealing 63 provides a closed volume of the back chamber when the cap 30 and the substrate 10 are joined together.

A method for preparing the substrate 10 will be described with reference to FIG. 11A to FIG. 11J.

Refer to FIG. 11A, the substrate 10 in some embodiments has a sensing circuit 50. For example, the substrate 10 is a CMOS ASIC wafer and the sensing circuit 50 is an ASIC. At least a pad 71 formed on the bottom surface of the substrate 10 and electrically connected to the sensing circuit 50 by a redistribution layer (RDL) 79. A photolithography processing is performed to define the TSV (through-silicon-via) area 72 corresponding to pads 71, as shown in FIG. 11B. Deep Si etching is then performed in the ASIC wafer for obtaining the TSVs 52, and the photoresist 73 is removed, as shown in FIG. 11C. An insulating layer 74 is formed on the sidewall of the TSV 52 and at the back surface of the ASIC wafer, as shown in FIG. 11D. A CVD, PVD or any other deposition scheme can be used to form the insulating layer 74. A conductive material 75, e.g., metal, is deposited or electroplated to fill in the TSV 52 and connect to the sensing circuit 50, as shown in FIG. 11E.

Figure 11F:
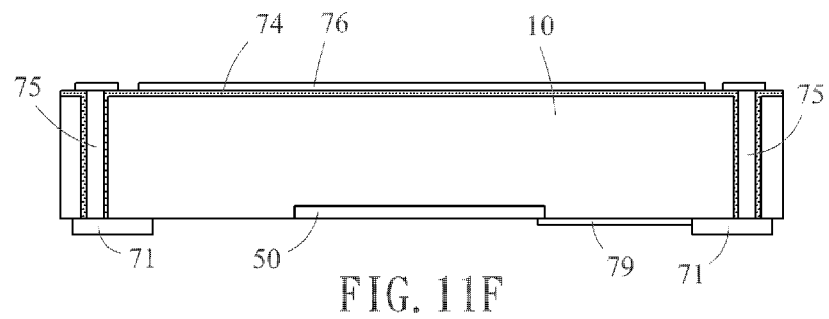

Refer to FIG. 11F, a conductive material 76 is deposited on the back surface of the substrate 10. The conductive material 76 defines a back plate 20 and a plurality of pads, such as pads 101 of FIG. 3, to be patterned.

Figure 11G:
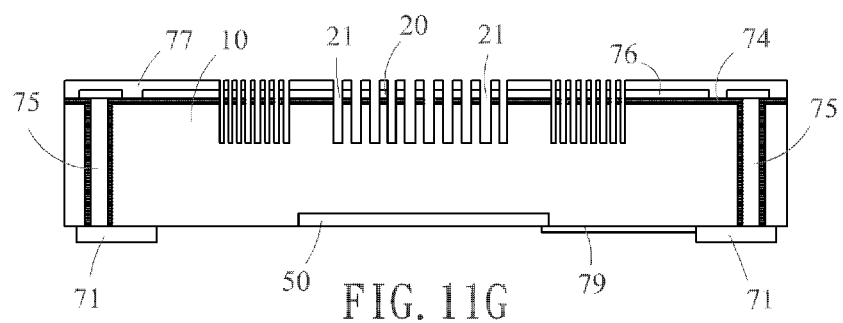

Refer to FIG. 11G, in one or more embodiments, a photoresist layer 77 is deposited to cover a part of the back plate 20 and the pads. At least one through hole 21 is then formed, by etching, through the back plate 20 in the uncovered areas. The etching continues to not only extend through the back plate but also further extend into a thickness of the substrate 10. The holes 21 are acoustic holes. The etching is anisotropic etching or ICP dry etching. Other processes are, however, not excluded. The diameter of each hole 21 could be 10 to 100 μm. A plurality of pads may can be formed on a surface of the substrate 10, as shown in FIG. 3. For example, the pads can be made of an UBM (under bump metallurgy/metallization) in some embodiments.

Figure 11H:
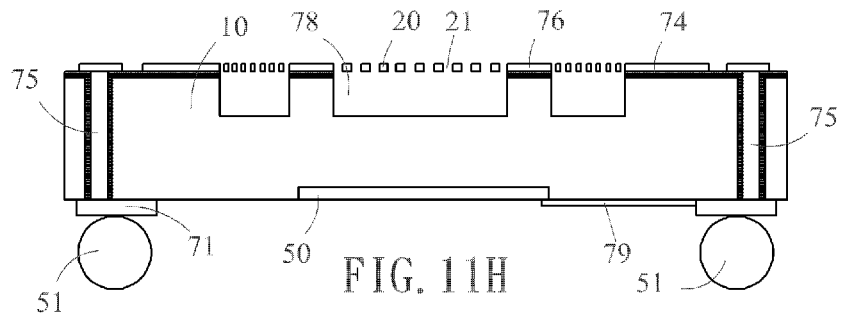

Refer to FIG. 11H, the material of the substrate 10 under the back plate 20 is etched away to define an auxiliary back chamber 78. For example, isotropic etching or $XeF_2$ etching can be used to etch the substrate 10.

Figure 11I:
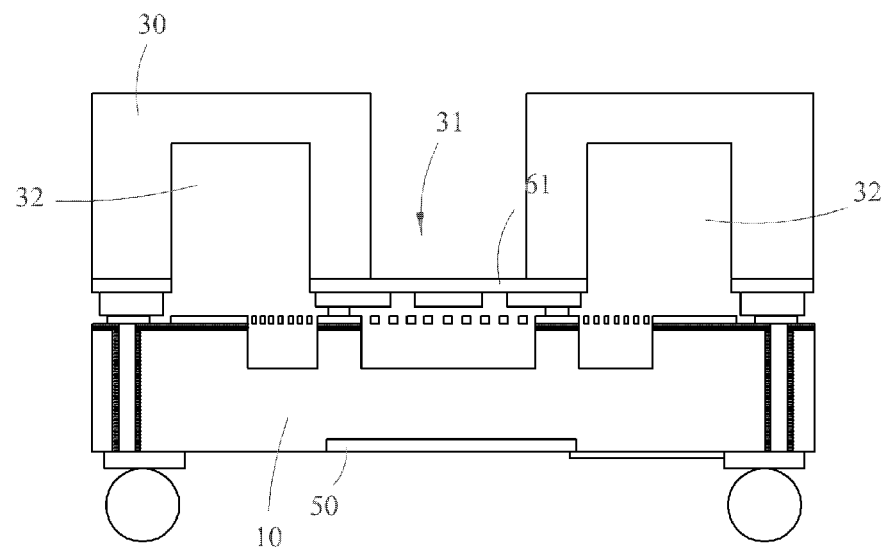

Refer to FIG. 11I, the cap 30 and the substrate 10 are bonded together, forming a stacked wafer, for example, a stacked microphone wafer. The bonding method in some embodiments is wafer-to-wafer, chip-to-chip, chip-to-wafer bonding. The cap 30 is bonded to the substrate 10 so that the diaphragm 40 and the back plate 20 form a capacitor. In one or more embodiments, a seal 63 is formed to extend around the cavity 32, and the capacitor, and the diaphragm 40 or the back plate 20 is electrically connected to a contact pad on the substrate 10 or the cap 30, respectively.

Figure 11J:
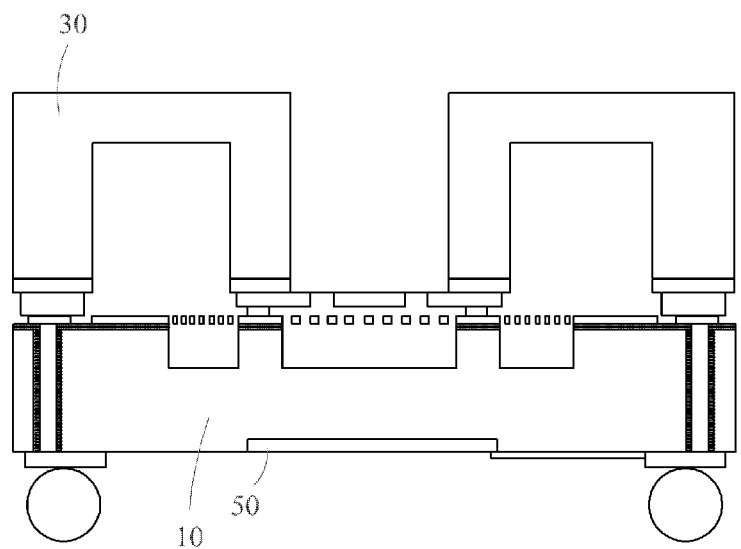

Refer to FIG. 11J, the sacrificial layer 61 is removed from the cap wafer 301 by etching, to thereby complete cap 30. The diaphragm 40 is then exposed to extend across the through-hole 31. The sacrificial layer 61 in some embodiments is a thermal oxide layer and can be removed by vapor HF etching.

What is claimed is:

1. A capacitive transducer, comprising:
    a substrate;
    a first electrode mounted on the substrate;
    a cap having a through-hole and a cavity surrounding the through-hole;
    a second electrode mounted on the cap across the through-hole;
    wherein the second electrode is deformable in response to pressure fluctuations applied thereto via the through-hole and defines, together with the first electrode, a capacitor having a capacitance variable with the pressure fluctuations; and the cavity defines a back chamber for the deformable second electrode.

2. The capacitive transducer according to claim 1, wherein the substrate further comprises at least one concave portion in acoustic communication with the cavity of the cap to define, together with said cavity, a larger back chamber for the deformable second electrode.

3. The capacitive transducer according to claim 2, wherein at least one of the first and second electrodes has at least one through hole.

4. The capacitive transducer according to claim 1, further comprising a sensing circuit in or on the substrate, and electrically coupled to the first and second electrodes for sensing the capacitance of the capacitor.

5. The capacitive transducer according to claim 4, wherein the substrate further includes at least one via and at least one solder ball, and the via electrically connects the solder ball to the sensing circuit.

6. The capacitive transducer according to claim 5, wherein the cap and the solder ball are on opposite sides of the substrate.

7. The capacitive transducer according to claim 4, further comprising a solder ball electrically connected to the sensing circuit for making an electrical connection to external devices; wherein the cap and the solder ball are on the same side of the substrate.

8. The capacitive transducer according to claim 1, further comprising: a sealing ring disposed between the cap and the substrate and hermetically sealing the back chamber which is in acoustic communication with an outside of the transducer only via the through-hole.

9. The capacitive transducer according to claim 1, wherein the cap has a body, and inner and outer loop portions extending from the body toward the substrate, the cavity is an annular chamber formed between the inner loop portion and the outer loop portion, and the through-hole is formed inside the inner loop portion.

10. The capacitive transducer according to claim 9, wherein the inner loop portion and the outer loop portion respectively terminate at first and second ends, and
    the transducer further comprises a support between (a) at least one of the first and second ends and (b) the substrate.

11. A microphone, comprising:
    a housing having an internal volume and an opening that opens into said internal volume;
    a conductive back plate on a wall of the housing inside the internal volume;
    a conductive diaphragm extending across the opening and being displaceable relative to the back plate in response to acoustic waves applied to the diaphragm, wherein the conductive diaphragm and the opening are disposed at a same side with respect to the backplate; and
    a sensing circuit electrically connected to the diaphragm and the back plate for sensing relative displacements of the diaphragm and the back plate, and generating a signal indicative of the acoustic waves that caused the relative displacements;
    wherein the internal volume defines a back acoustic chamber for the diaphragm and is disposed on both sides of a plane of the diaphragm.

12. The microphone according to claim 11, wherein the back acoustic chamber is disposed on both sides of a plane of the back plate.

13. The microphone according to claim 12, wherein at least one of the diaphragm and the back plate has at least one through hole.

14. The microphone according to claim 11, wherein the back acoustic chamber comprises an annular cavity extending around the opening.

15. The microphone according to claim 11, wherein the diaphragm has opposite front and rear sides facing outwardly and inwardly of the housing, respectively; and
- a majority of the back chamber is positioned on the front side of the diaphragm.

\* \* \* \* \*